UNITED STATES PATENT OFFICE.

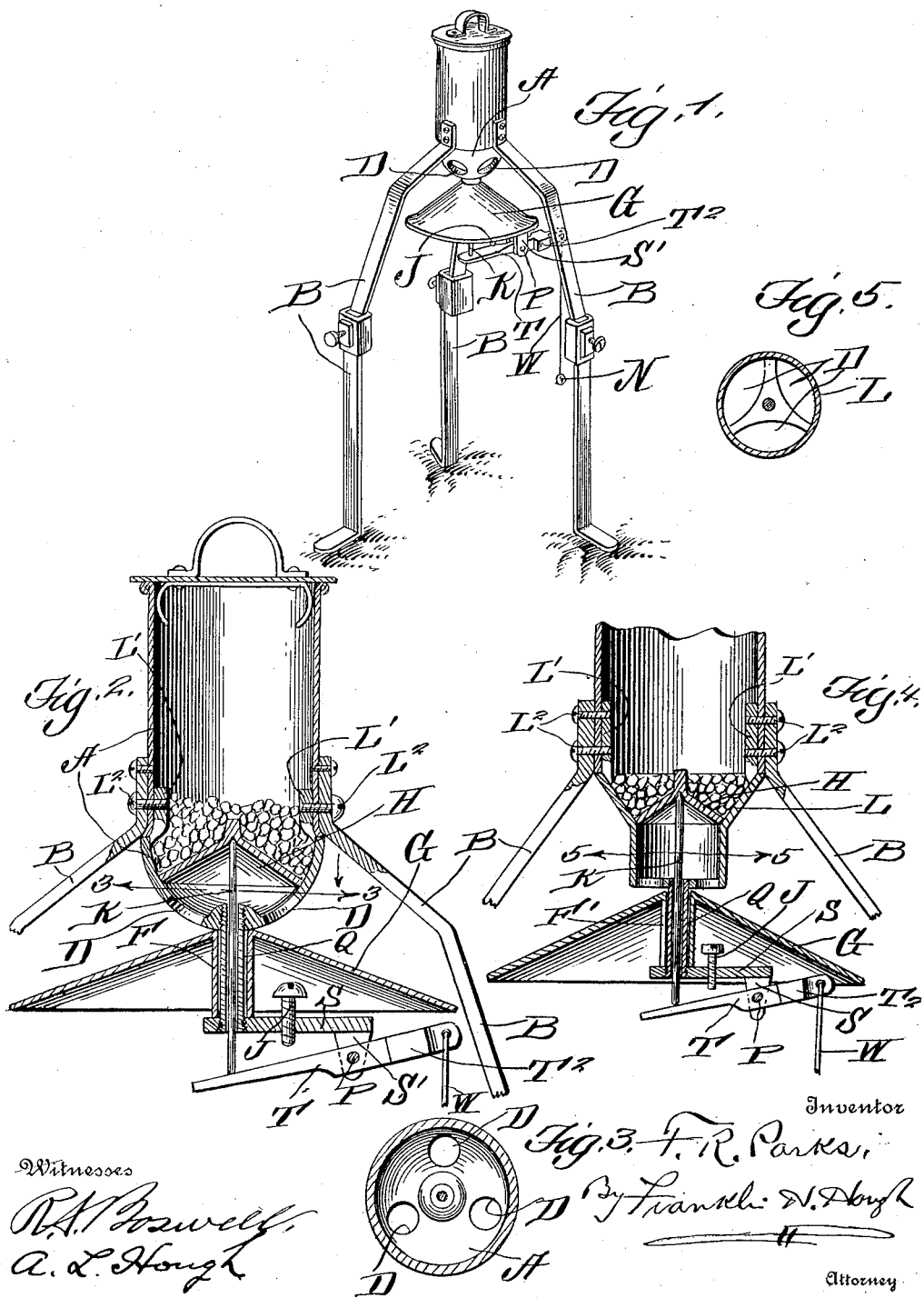

FREDERICK ROW PARKS, OF OSWEGO, NEW YORK, ASSIGNOR TO WILLIAM P. KING, OF SYRACUSE, NEW YORK.

AUTOMATIC POULTRY-FEEDER.

1,104,701. Specification of Letters Patent. Patented July 21, 1914.

Application filed January 29, 1914. Serial No. 815,257.

*To all whom it may concern:*

Be it known that I, FREDERICK R. PARKS, a citizen of the United States, residing at Oswego, in the county of Oswego and State of New York, have invented certain new and useful Improvements in Automatic Poultry-Feeders; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in automatic feeding devices for poultry culture and comprises a simple and efficient device of this nature having various details of construction and combinations and arrangements of parts which will be hereinafter fully described, shown in the accompanying drawings and then specifically defined in the appended claims.

I illustrate my invention in the accompanying drawings, in which:—

Figure 1 is a perspective view, partially in section, of my invention. Fig. 2 is an enlarged central vertical sectional view. Fig. 3 is a sectional view on line 3—3 of Fig. 2. Fig. 4 is a central sectional view of a slight modification of the invention, and Fig. 5 is a section on line 5—5 of Fig. 4.

Reference now being had to the details of the drawings by letter, A designates a receptacle or hopper adapted to contain the grain or other food to be automatically fed and in the drawings I have shown the hopper supported upon legs B. The lower end of the hopper has feed openings D formed therein and has an aperture at its lower end in which the tube Q is fastened. G designates a deflecting hood, which is provided with a central tubular shell F and is adapted to throw laterally the feed as it makes exit through said openings. A conical-shaped valve, designated by letter H, is mounted loosely upon the stem E, the upper end of the stem being tapered to engage a similar hole formed in the apex of said member. Said stem passes through said tube Q, which has threaded connection with the laterally projecting bracket S and which latter supports said tubular shell F' and hood G. The bracket member is provided with lugs S' carrying a pivotal pin P upon which the counterbalanced lever T is mounted, one end of which is weighted as at $T^2$, while the other end is positioned underneath said stem and adapted to impart a longitudinal movement to the latter when the weight or counterbalanced end is tilted down. A wire, designated by letter W, is fastened at its upper end to said counterbalanced end of the lever and is adapted to carry a bait, such as a kernel of corn, designated by letter N. A set screw J is mounted in a threaded aperture in said bracket member and may be adjusted to serve as a stop to limit the tilting movement of the lever in one direction.

In Fig. 4, I have shown a slight modification of the invention in which a different shaped hopper, designated by letter L, is provided which has lugs L' at its upper end for attachment to any support and the bottom of said hopper is provided with exit openings, otherwise, the modified form is adapted to be utilized in the same manner as shown in Fig. 1.

In operation, when the parts are adjusted as shown in Fig. 1, the fowl, when it pulls upon the bait or kernel of corn, is adapted to tilt the counterbalanced lever and arm thereof which bears against the stem will impart an upward longitudinal movement to the latter, thus raising the conical-shaped valve within the receptacle and allowing the grain or other food to make exit through the openings in the bottom of the hopper and be spread laterally by the deflecting hood. By the adjustment of the set screw, the distance that the stem will be thrown in its upper movement may be limited, thus regulating the feeding.

It will be noted upon reference to the sectional view that the lower part of the hopper is contracted and is concaved so that, as the valve rises, the food may fall down through to the openings in the bottom thereof.

What I claim to be new is:—

1. An automatic poultry feeding device comprising a receptacle having openings in the lower portion thereof, a conical-shaped valve within the receptacle, a tubular shell connected to and communicating with the lower portion of the receptacle, a stem movable through said tubular shell and engaging said valve, a bracket member secured to the tubular shell, a tilting lever mounted upon a projection of said bracket member, said stem adapted to rest upon one end of the lever, a bait-carrying wire connected to the other end of the lever, and means for limiting the throw of said lever.

2. An automatic poultry feeding device comprising a receptacle having openings in the lower portion thereof, a conical-shaped valve within the receptacle, a tubular shell connected to and communicating with the lower portion of the receptacle, a stem movable through said tubular shell and engaging said valve, a bracket member secured to the tubular shell, a tilting lever mounted upon a projection of said bracket member, said stem adapted to rest upon one end of the lever, a bait-carrying wire connected to the other end of the lever, an adjusting screw mounted in said bracket member and adapted to limit the throw of the lever, and a conical-shaped deflector having a central cylindrical opening to receive said tubular shell.

In testimony whereof I hereunto affix my signature in presence of two witnesses.

FREDERICK ROW PARKS.

Witnesses:
 EDWIN W. PARKS,
 LEON E. E. PARKS.

Copies of this patent may be obtained for five cents each, by addressing the "Commissioner of Patents, Washington, D. C."